(12) United States Patent
Osborne, III (10) Patent No.: US 10,623,365 B2
(45) Date of Patent: Apr. 14, 2020

(54) MESSAGE REDIRECTION PROTOCOL

(71) Applicant: Binarytree.com, Inc., Kendall Park, NJ (US)

(72) Inventor: Paul James Osborne, III, Madison, WI (US)

(73) Assignee: Binarytree.com, Inc., Madison, WI (US)

( * ) Notice: Subject to any disclaimer, the term of this patent is extended or adjusted under 35 U.S.C. 154(b) by 0 days.

(21) Appl. No.: 16/156,752

(22) Filed: Oct. 10, 2018

(65) Prior Publication Data

US 2019/0364007 A1     Nov. 28, 2019

Related U.S. Application Data

(60) Provisional application No. 62/676,762, filed on May 25, 2018.

(51) Int. Cl.

| G06F 15/16 | (2006.01) |
|---|---|
| H04L 12/58 | (2006.01) |
| H04L 29/06 | (2006.01) |
| H04L 29/12 | (2006.01) |
| H04L 29/08 | (2006.01) |

(52) U.S. Cl.
CPC .......... *H04L 51/28* (2013.01); *H04L 61/2007* (2013.01); *H04L 67/14* (2013.01); *H04L 69/26* (2013.01)

(58) Field of Classification Search
CPC ...... H04L 51/28; H04L 61/2007; H04L 69/26
USPC ....................................................... 709/206
See application file for complete search history.

(56) References Cited

U.S. PATENT DOCUMENTS

| 7,882,186 B1* | 2/2011 | Sun ...................... G06Q 10/107 709/203 |
|---|---|---|
| 8,904,168 B1* | 12/2014 | Emigh .................. H04L 63/123 709/218 |
| 2003/0074408 A1* | 4/2003 | Clark ...................... H04L 51/28 709/206 |
| 2003/0225850 A1* | 12/2003 | Teague ................. G06Q 10/107 709/207 |
| 2005/0114453 A1* | 5/2005 | Hardt ..................... H04L 51/12 709/206 |
| 2007/0204341 A1* | 8/2007 | Rand .................... G06Q 10/107 726/22 |

(Continued)

*Primary Examiner* — Hee Soo Kim
(74) *Attorney, Agent, or Firm* — Eversheds Sutherland (US) LLP (57) ABSTRACT

The disclosure describes a system that assigns an internet protocol (IP) address to each of one or more tenants, establishes an inbound connection with each of one or more tenants, and identifies each of one or more tenants based on the IP address and a destination address associated with the each of one or more tenants. The system further establishes an outbound connection with the each of one or more tenants, receives one or more commands and a message from each of one or more tenants, and determines an email address of at least one first tenant, of the one or more tenants, based at least in part on the one or more commands and the message. The system further updates one or more email addresses in one or more message headers with the domain of the at least one first tenant, and transmits the message to the at least one first tenant during an overlapping simple mail transport protocol (SMTP) session.

11 Claims, 5 Drawing Sheets

(56) References Cited

U.S. PATENT DOCUMENTS

2011/0302260 A1* 12/2011 Reddy .................. G06Q 10/107
709/206
2013/0311583 A1* 11/2013 Humphreys ............ H04L 51/14
709/206
2017/0034100 A1* 2/2017 Zink ....................... H04L 51/22

* cited by examiner

MESSAGE REDIRECTION PROTOCOL

CROSS-REFERENCE TO RELATED PATENT APPLICATION

The present application is related to and claims priority from U.S. Provisional Patent Application No. 62/676,762, the disclosure of which is incorporated by reference as set forth in full.

FIELD

This disclosure generally relates to multitenant messaging systems, and more particularly to systems and methods for directing messages between tenants in a multitenant system or network and users external to those tenants.

BACKGROUND

Multitenant systems provide users with access to a suite of services including e-mail applications, calendar applications, word processing applications, spreadsheet applications, without the user having to install the applications locally on their device. This provides a user with the ability to use the suite of services on different devices, thereby preventing the user from being tethered to a single device. The suite of services may be accessible to the user through a user account. Oftentimes an organization manages the user account and several other user accounts. The organization may be referred to as a tenant, by an information technology (IT) company hosting the suite of services for the user account. The IT company may assign a domain to the tenant, which is used by user accounts internal to the organization, and user accounts external to the organization, when a message needs to be sent to user accounts internal to the organization.

If the organization merges with, or is acquired by, another company, the messages sent from user accounts within the organization to external user accounts need to reflect the domain of the pre-merger or pre-acquisition organization in some instances. In other instances, the messages need to reflect the domain of the post-merger or post-acquisition organization.

Organizations, large and small, are in a constant state of change. Mergers, acquisitions, and divestitures may be the driving force behind this change. When an organization is merged with another organization, or the organization is acquired by another organization, the information technology (IT) infrastructure of the organizations is usually consolidated. After the consolidation of the IT infrastructure of two organizations, the resulting IT infrastructure is oftentimes plagued with technological challenges that must be addressed by IT administrators. One challenge that IT administrators face is the process of migrating the user accounts (e.g., e-mail accounts, electronic calendar accounts, and other services offered by the premerger organization) from a tenant, or domain, that the user accounts belonged to before the merger, to a tenant, or domain, of the consolidated organization. This may become especially challenging when different organizations are associated with different tenants. This challenge exists because a single accepted simple mail transport protocol (SMTP) domain can only be registered to a single tenant at a given time. This presents significant technical obstacles for organizations that require a unified shared domain space when their users exist in different tenants.

In particular, when two or more organizations have been consolidated, it might be desirable for messages sent from user accounts that are in the domain associated with the consolidated IT infrastructure to appear as though they are still originating from the domain associated with the individual organizations before the consolidation. It also might be desirable for messages sent from user accounts that have not been migrated to the domain associated with the consolidated IT infrastructure to appear as though they are originating from the domain associated with the consolidated IT infrastructure. Existing technologies achieve these objectives by relying on SMTP servers to store and forward messages. But this technology has some disadvantages.

BRIEF DESCRIPTION OF FIGURES

Reference will now be made to the accompanying drawings, which are not necessarily drawn to scale, and wherein.

The disclosure describes embodiments more fully hereinafter with reference to the accompanying drawings, in which example embodiments are disclosed. This disclosure may, however, be embodied in many different forms and should not be construed as limited to the example embodiments set forth herein; rather, these embodiments are provided so that this disclosure will be thorough and complete, and will fully convey the scope of the disclosure to those skilled in the art. Like numbers refer to like, but not necessarily the same or identical, elements throughout.

DETAILED DESCRIPTION OF EMBODIMENTS OF THE DISCLOSURE

Disclosed herein is a message redirection protocol that enables user accounts to be viewed, both inside and outside of the consolidated IT infrastructure, as a single accepted unified shared domain space. The message redirection protocol accomplishes this by updating or replacing the email addresses in the headers of messages exchanged between a user account in the consolidated IT infrastructure and a user account that is external (external user account) to the consolidated IT infrastructure. By replacing or updating the email addresses in a message, the messages can be made to appear as though they are still originating from the domain that the user account originally belonged to before the consolidation. Alternatively, the messages can be made to appear as though they are originating from the domain associated with the consolidated IT infrastructure, even though the user account has not been migrated from its original domain, to the consolidated IT infrastructure domain.

Figure 4:
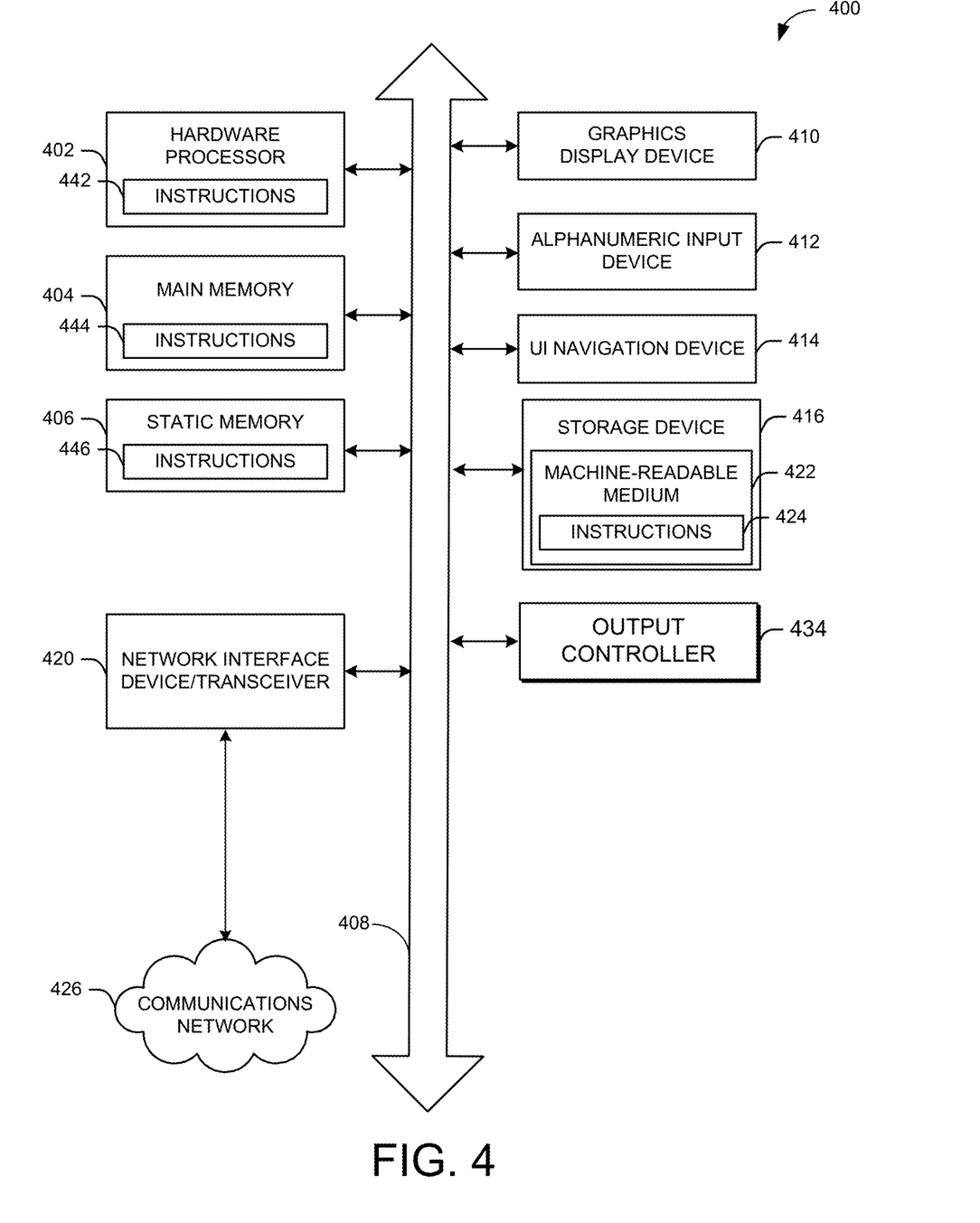
FIG. 4 depicts a block diagram of an example machine upon which any of one or more techniques (e.g., methods) may be performed, in accordance with one or more embodiments of the disclosure.

The message redirection protocol may be implemented in a hardware cluster, referred to as a message redirection protocol cluster, comprising hardware similar to that outlined in FIG. 4. The message redirection protocol cluster avoids storing messages, thereby reducing the amount of storage needed to store messages that will eventually be forwarded to the domain of the intended recipient of the message. Furthermore, instead of receiving a message from one domain (i.e., source domain) and having to forward it to another domain (i.e., destination domain), the message whose email addresses have been updated is simply returned to the domain that it received it from, which then delivers the updated message to the intended recipients. Additionally the hardware cluster requires less storage, does not require one hundred percent reliability, does not need to implement queueing, retries, and returning undeliverable messages, all of which may be necessary when forwarding and storing messages.

The message redirection protocol cluster eliminates the need for large storage capacity in an SMTP server, because the message redirection protocol cluster does not store the messages. The message redirection protocol cluster may also not require a lookup table to perform address lookups for the destination domain of a message. Because the message redirection protocol cluster forwards messages back to the tenant instead of attempting to forward them to the intended recipients, the message redirection protocol cluster only needs to communicate with the tenant's SMTP server implementation, thereby reducing the complexity of the hardware.

The message redirection protocol cluster may rewrite the e-mail addresses of an organization's users so they can hide their real e-mail addresses during merger/divestiture. Rewrites are configured using distribution groups to indicate which e-mail addresses require rewriting. Certain e-mail services such as those offered by Office365 have transport rules that use recipient and header conditions to forward only e-mail that needs rewriting to the message redirection protocol cluster. The message redirection protocol cluster rewrites may be implemented in an SMTP server that relays the rewritten e-mail back to the sender of the e-mail for final delivery.

Figure 5:
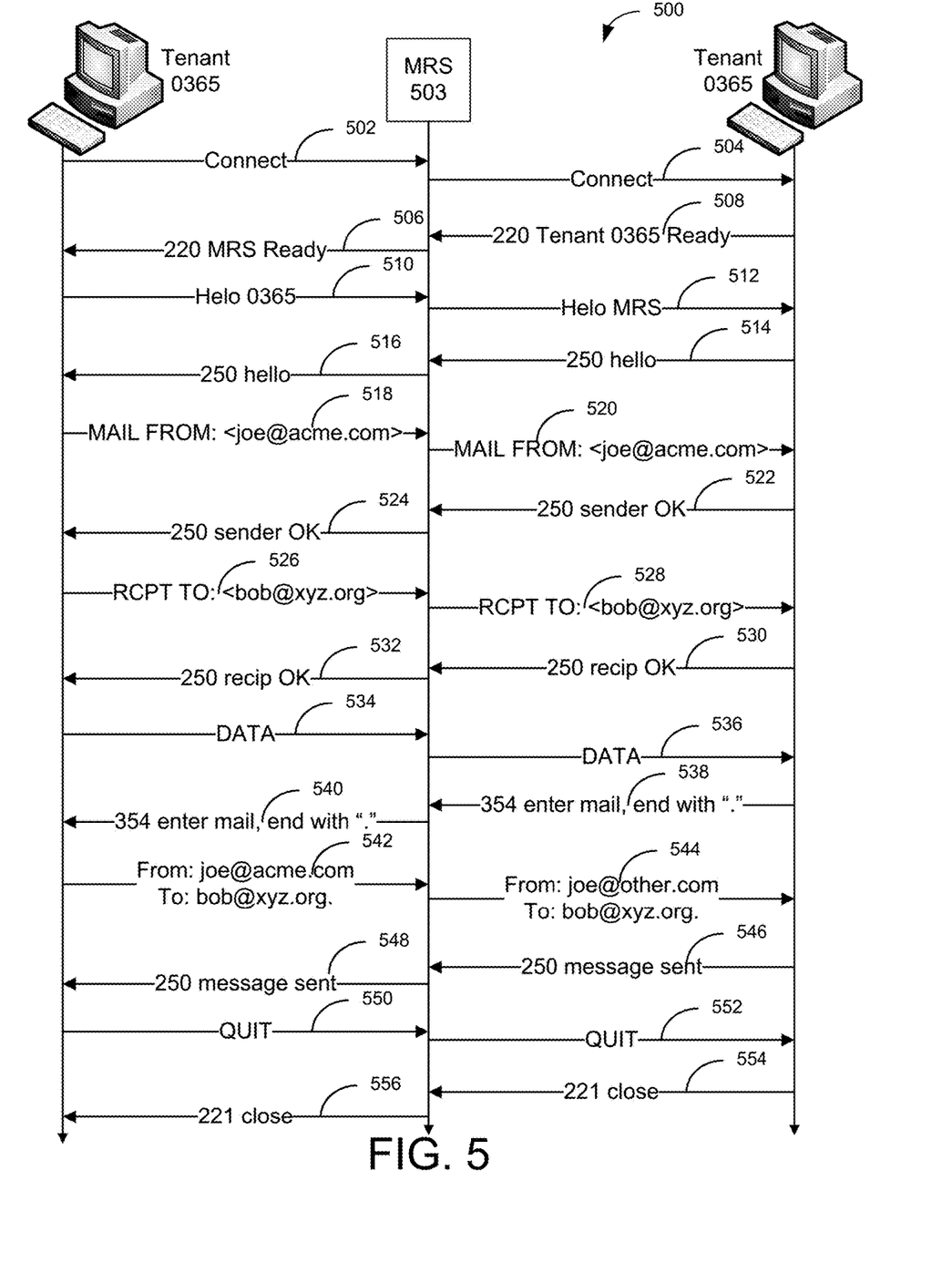
FIG. 5 depicts a timing diagram of an illustrative method for redirecting a message from one tenant to another tenant, in accordance with one or more embodiments of the disclosure.

The message redirection protocol cluster relays the e-mail back to the sender "on-the-fly" as illustrated in FIG. 5. The message redirection protocol cluster never takes responsibility for storing the e-mail. Storing an e-mail requires secure and reliable storage, and queued e-mails can require large amounts of storage. The message redirection protocol cluster does not queue e-mails nor does it participate in retrying delivery. The message redirection protocol cluster does not send non-delivery reports (NDRs). The message redirection protocol only communicates with the SMTP server implementation of the tenant with which it is exchanging the messages, simplifying its implementation.

The message redirection protocol cluster may add a new DKIM-Signature header to the e-mail after rewriting so the rewritten headers are still trusted by the recipients.

Figure 1:
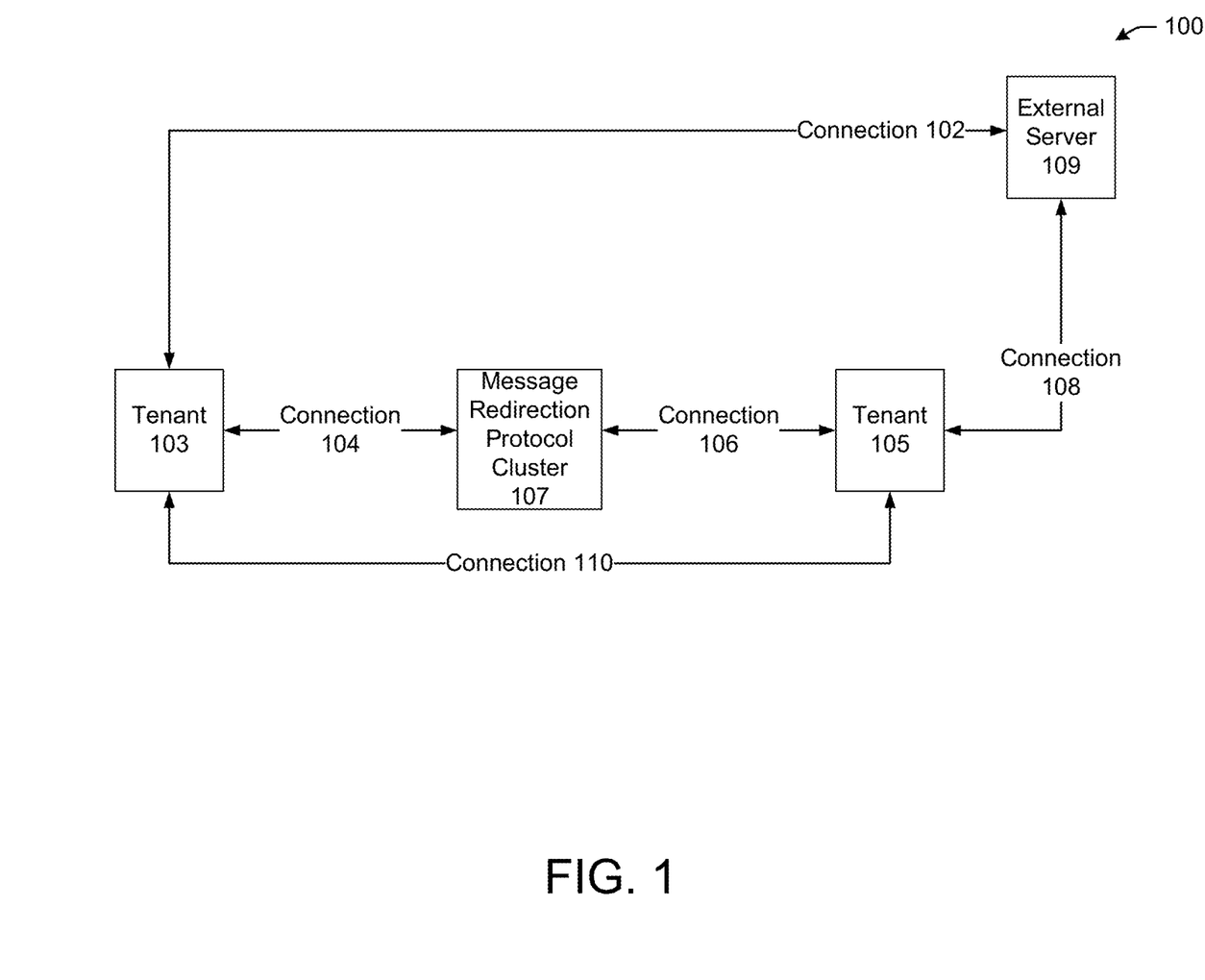
FIG. 1 is an illustrative schematic diagram of an exemplary network environment of a multitenant system, in accordance with one or more embodiments of the disclosure.

FIG. 1 is an illustrative schematic diagram of an exemplary network environment of a multitenant system, in accordance with one or more embodiments of the disclosure. Exemplary network 100 may be representative of a network connecting tenant 103 and tenant 105 to external mail server 109. Exemplary network 100 may be the internet, it may be an enterprise network, or any other network connecting one or more tenants, that belong to a private network (e.g., Network 101), to an external server (e.g., external server 109). Tenant 103 and tenant 105 may comprise one or more servers hosting one or more services including e-mail accounts, electronic calendar accounts, and other services. Message redirection protocol cluster 107 may comprise one or more servers or computers that may perform the actions outlined in method 300 and method 400 outlined below. Tenant 103 may exchange messages and commands with message redirection protocol cluster 107 via connection 104.

Connections 102 and 108 may be Internet links spanning large geographic areas. These links may be multi-hop internet connections. External server 109 may be a server in a network that may not be a part of the consolidated IT infrastructure or pre-consolidated IT infrastructure. For example, external server 109 may belong to a network servicing an organization that is not affiliated with the organization serviced by network 101, connection 102 may connect tenant 103 to external server 109, and connection 108 may connect tenant 105 to external server 109. Connection 106 may connect message redirection protocol cluster 107 and tenant 105. Connections 104 and 106 may be Internet links spanning large geographic areas. These links may be multi-hop internet connections.

It should be noted that in some embodiments, connection 102, 104, 106, 108, and 110 may enable bidirectional communication between computing devices connected to one another via the connection. For example, tenant 103 may send one or more SMTP commands to message redirection protocol cluster 107 via connection 104, and message redirection protocol cluster 107 may send one or more SMTP commands to tenant 103 via connection 104.

Figure 2:
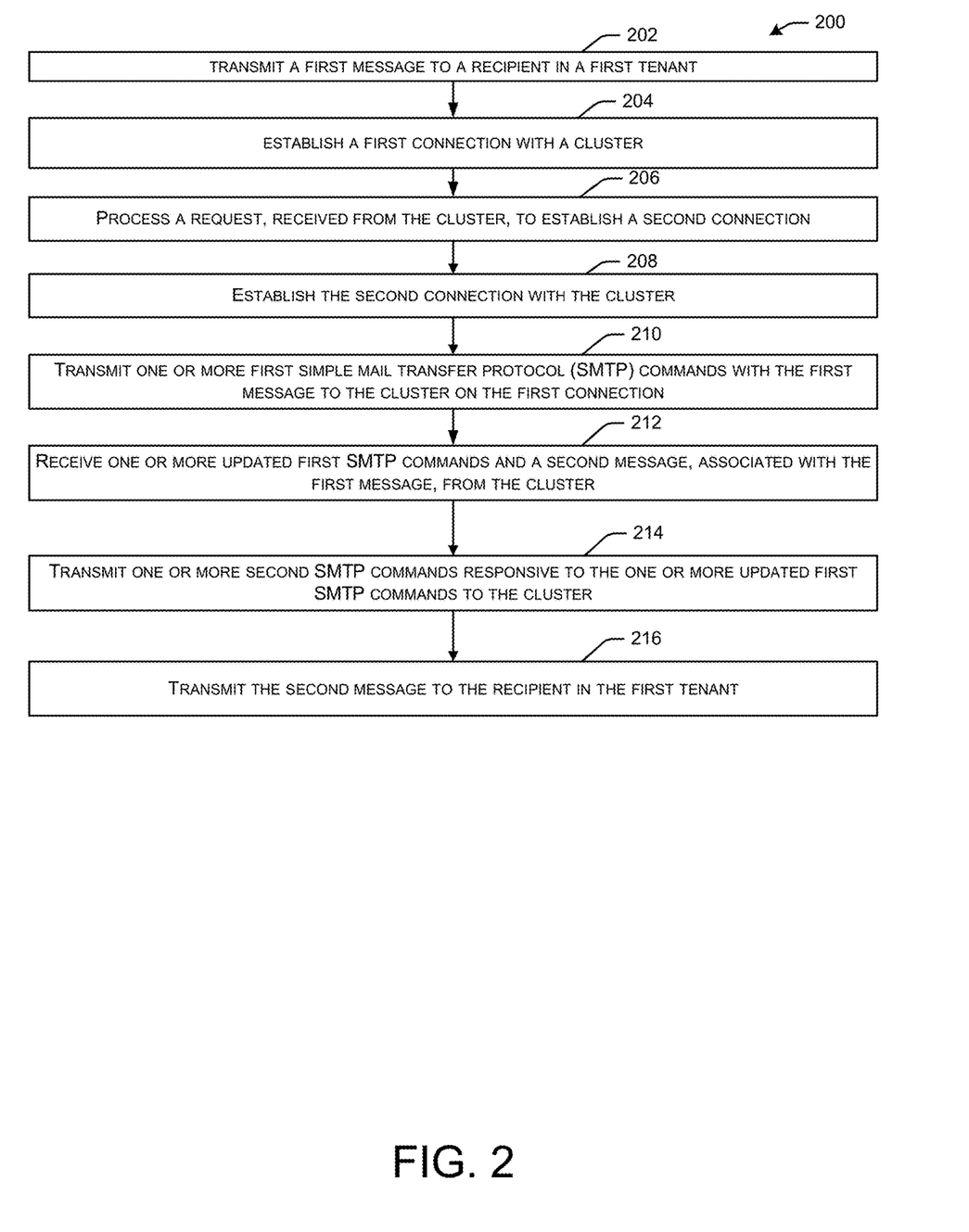
FIG. 2 is a data flow diagram of an illustrative method for redirecting a message from one tenant to another tenant, or a recipient connected to an external server, in accordance with one or more embodiments of the disclosure.

FIG. 2 is a data flow diagram of an illustrative method for redirecting a message from one tenant to another tenant, or a recipient connected to an external server, in accordance with one or more embodiments of the disclosure. Referring to FIG.2, it will be readily appreciated that the illustrated procedure can be altered to delete blocks or further include additional blocks. At block 202, the method may transmit a first message to a recipient in a first tenant. For example, tenant 103 may transmit the first message to a recipient in tenant 105. . At block 204, the method may establish a first connection with a cluster. For example, tenant 103 may establish a connection with message redirection protocol cluster 107. The first connection may be a connection in which tenant 103 sends simple mail transport protocol (SMTP) commands and messages to message redirection protocol cluster 107. Tenant 103 is an SMTP server and message redirection protocol cluster 107 is an SMTP client in the first connection. Message redirection protocol cluster 107 recognizes that the first connection is from tenant 103 based at least in part on the source internet protocol (IP) address and destination IP address. For instance an IP address associated with tenant 103 may be listed in a source IP address field in one or more messages establishing the first connection. The IP address associated with message redirection protocol cluster 107may be listed in a destination IP address field in the one or more messages establishing the first connection. At block 206, the method may process a request, received from the cluster, to establish a second connection. For example, tenant 103 may process a request received from message redirection protocol cluster 107.

At block 208, the method may establish the second connection with message redirection protocol cluster 107. The second connection may be a connection in which message redirection protocol cluster 107 sends simple mail transport protocol (SMTP) commands and messages to tenant 103. Message redirection protocol cluster 107 is an SMTP server and tenant 103 is an SMTP client in the second connection. Tenant 103 recognizes that the first connection is from message redirection protocol cluster 107 based at least in part on the source internet protocol (IP) address and destination IP address. For instance an IP address associated with message redirection protocol cluster 107 may be listed in a source IP address field in one or more messages establishing the second connection. The IP address associated with tenant 103 may be listed in a destination IP address field in the one or more messages establishing the second connection.

At block 210, the method may transmit one or more first SMTP commands with the first message to message redirection protocol cluster 107. For example, tenant 103 may transmit the one or more first SMTP commands along with a first message to message redirection protocol cluster 107.

At block 212, the method may then receive one or more updated first SMTP commands and a second message, associated with the first message, from message redirection protocol cluster 107. For example, tenant 103 may receive one or more updated first SMTP commands and a second message, associated with the first message, from message redirection protocol cluster 107. The second message may be similar to the first message in that the content of the second message is the same as the content in the first message, however the destination addresses in the second message may be different than the destination addresses in the first message. In some embodiments, a new DKIM-signature may be added to the second message.

At block 214, the method may transmit one or more second SMTP commands responsive to the one or more updated first SMTP commands to the cluster. For example, tenant 103 may transmit one or more second SMTP commands responsive to one or more updated first SMTP commands that it receives from message redirection protocol cluster 107. At block 216, the method may transmit the second message to the recipient in the first tenant. For example, tenant 103 may transmit the second message to a recipient in tenant 105. Once the SMTP transactions are complete (e.g., ending with a DATA or BDAT command and a 200-level response), the first message is removed from storage, and tenant 103 is responsible for delivering the second message to the recipient in tenant 105. The second message is transmitted from tenant 103 to tenant 105 via connection 110. After block 216 the method may end.

It should be noted that if the first message was instead sent from tenant 103 to a recipient connected to external server 109, the method in FIG. 2 would be identical, except that, after the SMTP transactions are complete, tenant 103 would be responsible for delivering the second message to the recipient connected to external server 109 instead of tenant 105. Tenant 103 may transmit the second message to the recipient connected to external server 109 via connection 102.

Referring to FIG. 2, it will be readily appreciated that fewer or greater number of operations or blocks may be included in the method and embodiments of the method as described.

Figure 3:
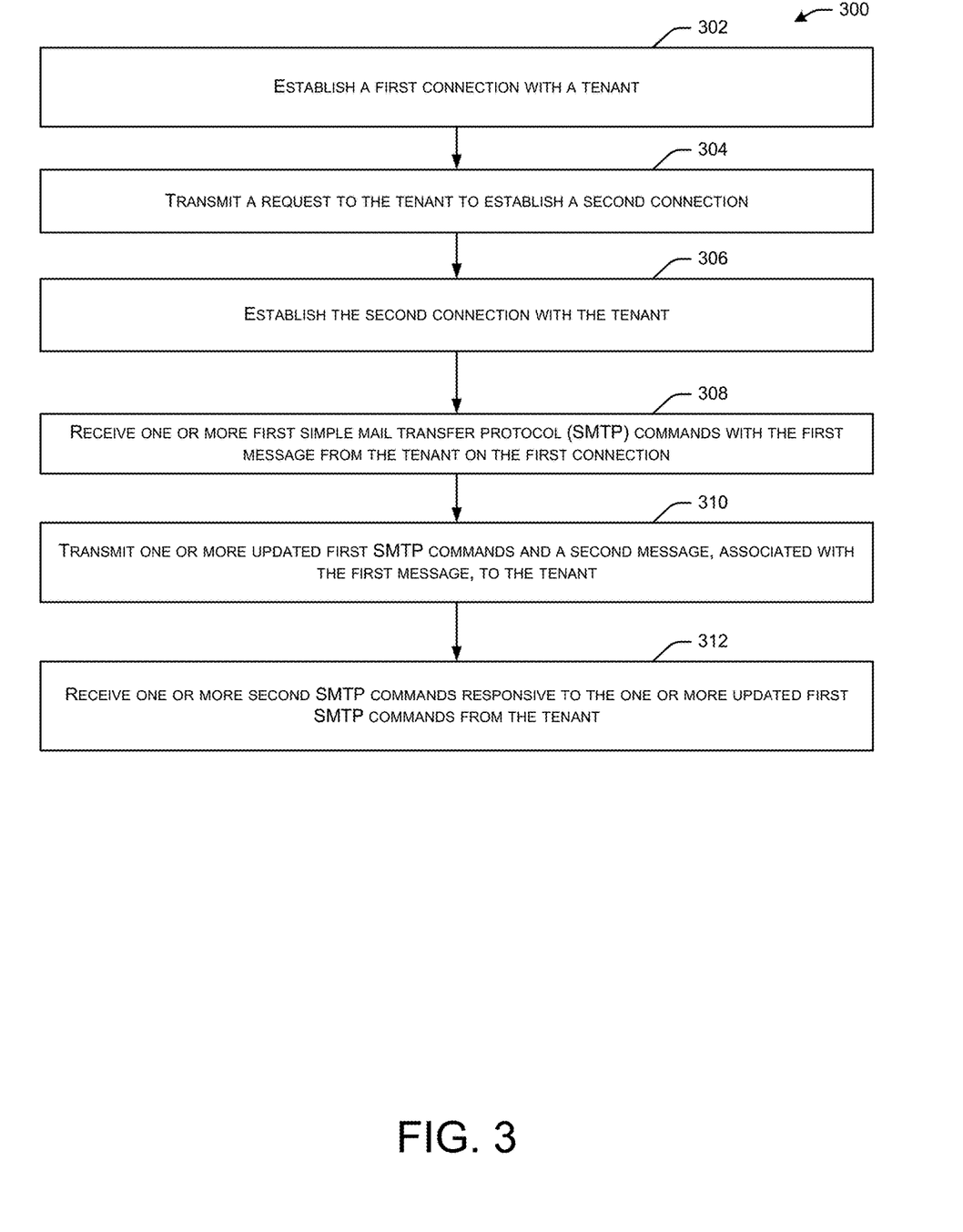
FIG. 3 is a data flow diagram of an illustrative method of an exchange between a tenant and message redirection protocol cluster, in accordance with one or more embodiments of the disclosure.

FIG. 3 is a data flow diagram of an illustrative method of an exchange between a tenant and message redirection protocol cluster, in accordance with one or more embodiments of the disclosure. Referring to FIG. 3, it will be readily appreciated that the illustrated procedure can be altered to delete blocks or further include additional blocks.

At block 302, the method may establish a first connection with a tenant. For example, message redirection protocol cluster 107 may establish a connection with tenant 103. The first connection may be a connection in which tenant 103 sends simple mail transport protocol (SMTP) commands and messages to message redirection protocol cluster 107. Tenant 103 is a SMTP server and message redirection protocol cluster 107 is a SMTP client in the first connection. Message redirection protocol cluster 107 recognizes that the first connection is from tenant 103 based at least in part on the source internet protocol (IP) address and destination IP address. For instance an IP address associated with tenant 103 may be listed in a source IP address field in one or more messages establishing the first connection. The IP address associated with message redirection protocol cluster 107 may be listed in a destination IP address field in the one or more messages establishing the first connection. At block 304, the method may transmit a request, received to the tenant, to establish a second connection. For example, message redirection protocol cluster 107 may transmit a request to tenant 103. At block 306, the method may establish the second connection with tenant. The second connection may be a connection in which message redirection protocol cluster 107 sends simple mail transport protocol (SMTP) commands and messages to tenant 103. Message redirection protocol cluster 107 is a SMTP server and tenant 103 is a SMTP client in the second connection. Tenant 103 recognizes that the first connection is from message redirection protocol cluster 107 based at least in part on the source internet protocol (IP) address and destination IP address. For instance an IP address associated with message redirection protocol cluster 107 may be listed in a source IP address field in one or more messages establishing the second connection. The IP address associated with tenant 103 may be listed in a destination IP address field in the one or more messages establishing the second connection.

At block 308, the method may receive one or more first SMTP commands with the first message from tenant 103. For example, message redirection protocol cluster 107 may receive the one or more first SMTP commands along with a first message from tenant 103.

At block 310, the method may then transmit one or more updated first SMTP commands and a second message, associated with the first message, to tenant 103. For example, message redirection protocol cluster 107 may transmit one or more updated first SMTP commands and a second message, associated with the first message, to tenant 103. The second message and the updated first SMTP commands may be sent during an overlapping outbound SMTP session to avoid ever being responsible for the message. For example, a MRS implementing block 310, becomes responsible for the message when it sends a response during an inbound SMTP session. The MRS remains responsible until it receives a response from a tenant during the outbound SMTP session. While responsible, the MRS must store the email in reliable storage, retry delivery to the tenant periodically, etc. Because the MRS overlaps the inbound and outbound SMTP sessions, an inbound message (e.g., 250 message sent 546) may be received from the tenant before an outbound message (e.g., 250 message 548) is sent to the tenant. The MRS may not inform the tenant that it accepts responsibility until after the tenant has already accepted responsibility.

With normal store-and-forward, the MRS becomes responsible for each recipient when it sends positive response messages from (e.g., 250 recip OK 532) to the tenant during the inbound SMTP session. The MRS remains responsible until it receives a positive response message (e.g., 250 recip OK 530) from the tenant during the outbound SMTP session. If the MRS receives a negative response message (e.g., 250 recip OK 530) from the tenant, the MRS remains responsible for that recipient, and must send a non-delivery report to the sender. But because the MRS overlaps the inbound and outbound SMTP sessions, an inbound message (e.g., 250 recip OK 530) occurs before an outbound message (e.g., 250 recip OK 532). The MRS does not inform the tenant that it accepts responsibility for a recipient until after it knows the tenant has already accepted responsibility. Additionally, the MRS only sends a positive response to the tenant if it received a positive response from the tenant. If the tenant refuses to accept responsibility for the recipient, the MRS informs the tenant, and responsibility for that recipient remains with the tenant. In either case, responsibility for the recipient is always with the tenant. The MRS is not responsible for the message.

The second message may be similar to the first message in that the content of the second message is the same as the content in the first message, however the destination addresses in the second message may be different than the destination addresses in the first message. In some embodiments, a new DKIM-signature may be added to the second message.

At block 312, the method may receive one or more second SMTP commands responsive to the one or more updated first SMTP commands from the tenant. For example, message redirection protocol cluster 107 may receive one or more second SMTP commands responsive to one more updated first SMTP commands that is transmits to tenant 103. Once the SMTP transactions are complete (e.g., ending with a DATA or BDAT command and a 200-level response), the first message is removed from storage. After block 312 the method may end.

Referring to FIG. 3, it will be readily appreciated that fewer or greater number of operations or blocks may be included in the method and embodiments of the method as described.

FIG. 4 illustrates a block diagram of an example of a machine 400 or system upon which any one or more of the techniques (e.g., methodologies) discussed herein may be performed. In other embodiments, the machine 400 may operate as a standalone device or may be connected (e.g., networked) to other machines. In a networked deployment, the machine 400 may operate in the capacity of a server machine, a client machine, or both in server-client network environments. In an example, the machine 400 may act as a peer machine in peer-to-peer (P2P) (or other distributed) network environments. The machine 400 may be a personal computer (PC), a network router, switch or bridge, or any machine capable of executing instructions (sequential or otherwise) that specify actions to be taken by that machine, such as a SMTP server. Machine 400 may a server hosting a mail submission agent (MSA), mail transfer agent (MTA), and instructions 442, 444, 446, and 424, may cause the MSA or MTA to perform the methods disclosed in FIGS. 3 and 4. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The machine 400 may further include a graphics display device 410, an alphanumeric input device 412 (e.g., a keyboard), and a user interface (UI) navigation device 414 (e.g., a mouse). In an example, the graphics display device 410, alphanumeric input device 412, and UI navigation device 414 may be a touch screen display. The machine 400 may additionally include a storage device (i.e., drive unit) 416. The machine 400 may include an output controller 434, such as a serial (e.g., universal serial bus (USB), parallel, or other wired or wireless (e.g., infrared (IR), near field communication (NFC), etc.) connection to communicate with or control one or more peripheral devices (e.g., a printer, card reader, etc.)).

The storage device 416 may include a machine readable medium 422 on which is stored one or more sets of data structures or instructions 424 (e.g., software) embodying or utilized by any one or more of the techniques or functions described herein. The instructions 424 may also reside, completely or at least partially, within the main memory 404, within the static memory 406, or within the hardware processor 402 during execution thereof by the machine 400. In an example, one or any combination of the hardware processor 402, the main memory 404, the static memory 406, or the storage device 416 may constitute machine-readable media.

While the machine-readable medium 422 is illustrated as a single medium, the term "machine-readable medium" may include a single medium or multiple media (e.g., a centralized or distributed database, and/or associated caches and servers) configured to store the one or more instructions 424.

The term "machine-readable medium" may include any medium that is capable of storing, encoding, or carrying instructions for execution by the machine 400 and that cause the machine 400 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., Electrically Programmable Read-Only Memory (EPROM), or Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 424 may further be transmitted or received over a communications network 426 using a transmission medium via the network interface device/transceiver 420 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), Plain Old Telephone (POTS) networks, wireless data networks (e.g., Institute of Electrical and Electronics Engineers (IEEE) 802.11 family of standards known as Wi-Fi®, IEEE 802.16 family of standards known as WiMax®), and peer-to-peer (P2P) networks, among others. In an example, the network interface device/transceiver 420 may include one or more physical jacks (e.g., Ethernet, coaxial, or phone jacks) or one or more antennas to connect to the communications network 426. In an example, the network interface device/transceiver 420 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 400 and includes digital or analog communications signals or other intangible media to facilitate communication of such software.

FIG. 5 depicts a timing diagram of an illustrative method for redirecting a message from one tenant to another tenant, or a recipient in an external server, in accordance with one or more embodiments of the disclosure. Operational environment 500 may comprise a tenant (e.g., tenant 0365) and a message rewrite server (MSR) (e.g., MRS 503). FIG. 5 illustrates two tenants labeled tenant 0365, but both tenants are the same. Two tenants with the same label are included so that the exchange of messages between tenant 0365 and MRS 503 can be illustrated in a single figure. Tenant 0365 and MRS 503 illustrate the relationship between tenant 103 and message redirection protocol cluster 107 respectively. That is tenant 0365 may be similar to tenant 103 and MRS 503 may be similar to message redirection protocol cluster 107.

SMTP commands 502, 506, 510, 516, 518, 524, 526, 532, 534, 540, 542, 548, 550, and 556, correspond to commands that may be sent on the first connection established between the tenant and cluster in FIGS. 2 and 3. In particular, these SMTP commands correspond to tenant 0365 being the SMTP client and MRS 503 being the SMTP server.

SMTP commands 504, 508, 512, 514, 520, 522, 528, 530, 536, 538, 544, 546, 552, and 554 correspond to commands that may be sent on the second connection established between the tenant and cluster in FIGS. 2 and 3. In particular, these SMTP commands correspond to tenant 0365 being the SMTP server and MRS 503 being the SMTP client.

MRS 503 may be a server in Message Redirection Protocol Cluster 107 and tenant 0365 may be tenant 103. In some embodiments, tenant 0365 may be tenant 105. Tenant 0365 may exchange one or more commands with MRS 503 in order to implement the message redirection protocol in FIG.4 and FIG. 5 above. Tenant 0365 may begin the message redirection protocol by transmitting an open connection command (connect 502) to MRS 503, to establish a connection with MRS 503. MRS 503 may respond by transmitting an open connection command (connect 504) to tenant 0365. Tenant 0365 may transmit a command (220 Tenant 0365 Ready 508) to MRS 503 indicating that tenant 0365 is ready to implement the message redirection protocol. MRS 503 may respond to tenant 0365 by transmitting a command (220 Tenant 0365 Ready 506) to tenant 0365 indicating that it is ready to receive a message from tenant 0365 that needs to be redirected in accordance with the message redirection protocol.

Tenant 0365 may initiate the beginning of the message redirection protocol with MRS 503 by transmitting a Helo command identifying itself (Helo 0365 510). The commands illustrated in FIG. 5 may be similar to those in Request for Comments (RFC) 821/2821/5321.MRS 503 may respond to tenant 0365 my transmitting a command identifying itself (Helo MRS 512). The format of the commands used between tenant 0365 and MRS 503 may be based at least in part on Request For Comments (RFC) (821/2821/5321).

Commands 502-528 are commands used in SMTP RFC 822. Tenant 0365 may transmit a command acknowledging that it received the portion of the message by transmitting an acknowledgment command (250 recip OK 530) to MRS 503. MRS 503 may in turn transmit an acknowledgment command (250 recip OK 532), to tenant 0365, in response to receiving the acknowledgment command (250 sender OK 530) from tenant 0365. The transmission of acknowledgment command (250 recip OK 532) in response to receiving the acknowledgment command (250 sender OK 530) is an overlapping SMTP session that results in MRS 503 not being responsible for the delivery of e-mail to the intended recipients.

Commands 534-540 are commands used in SMTP RFC 822. Tenant 0365 may transmit another portion of the message to MRS 503. For example, tenant 0365 may transmit a portion of the message associated with an e-mail address corresponding to the source of the message and an e-mail address corresponding to the destination of the message (From: joe@acme.com To: bob@xyz.org. 542). MRS 503 may in turn respond by transmitting the same portion of the message back to tenant 0365 with an updated e-mail address corresponding to the source of the message and the same e-mail address corresponding to the destination of the message (From: joe@other.com To: bob@xyz.org. 544). A new domain keys identified mail (DKIM) signature may be added to the message transmitted from MRS 503 to tenant 0365. The format of the messages exchanged in 542 and 544 may be defined by RFC 822.

After tenant 0365 receives the same portion of the message with the updated e-mail address, tenant 0365 may transmit a command to MRS 503, indicating to MRS 503 that the message has been sent to the destination (250 message sent 546). MRS 503 may in turn transmit a command to tenant 0365 acknowledging that the message has been sent to the destination (250 message sent 548). The receipt of 250 message 546 and transmission of 250 message 548 is an overlapping SMTP session that results in MRS 503 not being responsible for the delivery of e-mail to the intended recipients.

Commands 552-556 are commands used in SMTP RFC 822. MRS 503 may store the portions of the message that it receives in memory, or all of the message on disk temporarily if the message is too large to fit in memory. It should also be noted that MRS 503 is does not transmit the message to the destination. The tenant transmits the message to the recipient in a destination tenant. In some embodiments, a EHLO, STARTTLS, and BDAT commands may also be used during the message redirection protocol exchange illustrated in FIG. 5.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or blocks to be performed on the computer or other programmable apparatus to produce a computer-implemented process such that the instructions that execute on the computer or other programmable apparatus provide elements or blocks for implementing the functions specified in the flow diagram block or blocks.

Accordingly, blocks of the block diagrams and flow diagrams support combinations of means for performing the specified functions, combinations of elements or blocks for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or blocks, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A system, including:
    at least one memory storing computer-executable instructions; and
    at least one processor configured to access the at least one memory and to execute the computer-executable instructions to:
        assign an internet protocol (IP) address to each of one or more tenants;
        establish an inbound connection with each of one or more tenants;
        identify each of one or more tenants based on the IP address and a destination address associated with the each of one or more tenants;
        establish an outbound connection with the each of one or more tenants;
        receive one or more commands and a message from each of one or more tenants;
        determine an email address of at least one first tenant, of the one or more tenants, based at least in part on the one or more commands and the message;
        update one or more email addresses in one or more message headers with the domain of the at least one first tenant; and
        transmit the message to the at least one first tenant during an overlapping simple mail transport protocol (SMTP) session.

2. The system of claim 1, wherein the system is not responsible for delivery of the message.

3. The system of claim 1, wherein the message is transmitted via the outbound connection.

4. The system of claim 1, wherein the at least one processor is further configured to access the at least one memory and to execute the computer-executable instructions to:
    apply a domain keys identified mail (DKIM) signature to the message.

5. The system of claim 3, wherein the at least one processor is further configured to access the at least one memory and to execute the computer-executable instructions to:
    apply the signature to a header comprising the reply to sender field.

6. The system of claim 1, wherein the at least one processor is further configured to access the at least one memory and to execute the computer-executable instructions to:

determine a domain of at least one second tenant, of the one or more tenants, based at least in part on the one or more commands and the message;

update a domain in a reply to sender field in the message with the domain of the at least one second tenant; and transmit the message to the at least one second tenant.

7. The system of claim 1, wherein the at least one processor is further configured to access the at least one memory and to execute the computer-executable instructions to:

transmit the message via the inbound connection.

8. The system of claim 1, wherein the message is associated with office 365 distribution groups.

9. The system of claim 1, wherein the instructions further comprise transport rules.

10. The system of claim 1, wherein the at least one processor is further configured to determine day one or day two choices.

11. The system of claim 1, wherein the message is received based at least in part on a selective e-mail routing protocol.

* * * * *